US011897551B2

United States Patent
Hultén et al.

(10) Patent No.: US 11,897,551 B2
(45) Date of Patent: Feb. 13, 2024

(54) METHOD AND SYSTEM FOR COMBINED HYDRAULIC AND ELECTRIC POWER ASSISTED STEERING

(71) Applicant: SENTIENT IP AB, Gothenburg (SE)

(72) Inventors: Johan Hultén, Gothenburg (SE); Jochen Pohl, Partille (SE)

(73) Assignee: SENTIENT IP AB, Gothenburg (SE)

( * ) Notice: Subject to any disclaimer, the term of this patent is extended or adjusted under 35 U.S.C. 154(b) by 532 days.

(21) Appl. No.: 17/261,047

(22) PCT Filed: Aug. 16, 2019

(86) PCT No.: PCT/SE2019/050754
§ 371 (c)(1),
(2) Date: Jan. 18, 2021

(87) PCT Pub. No.: WO2020/050759
PCT Pub. Date: Mar. 12, 2020

(65) Prior Publication Data
US 2021/0253158 A1 Aug. 19, 2021

(30) Foreign Application Priority Data
Sep. 5, 2018 (SE) .................................. 1851059-4

(51) Int. Cl.
*B62D 5/00* (2006.01)
*B62D 6/00* (2006.01)

(52) U.S. Cl.
CPC .............. *B62D 5/006* (2013.01); *B62D 5/008* (2013.01); *B62D 6/00* (2013.01)

(58) Field of Classification Search
CPC ........... B62D 5/006; B62D 5/008; B62D 6/00
See application file for complete search history.

(56) References Cited

U.S. PATENT DOCUMENTS 6,546,322 B2 * 4/2003 Williams ............... B62D 6/008
701/41
11,214,302 B2 * 1/2022 Weiefors ............. B62D 15/025
(Continued)

FOREIGN PATENT DOCUMENTS

CN 105644621 6/2016
CN 107380255 A 11/2017
(Continued)

OTHER PUBLICATIONS

International Search Report issued in parent PCT/SE2019/050754, dated Nov. 29, 2019, pp. 1-2.
(Continued)

*Primary Examiner* — Kevin Hurley
*Assistant Examiner* — Michael R Stabley
(74) *Attorney, Agent, or Firm* — Jeffrey S. Melcher; Melcher Patent Law PLLC

(57) ABSTRACT

The present invention relates to a system and a method for controlling a feedback torque actuator in a steering system. The steering system comprises a steering assistance actuator (140) with a torsion bar (128) and a feedback torque actuator (130) with an Electric Control Unit, ECU, for giving feedback to a driver, a steering wheel (120) to which the driver applies a driver torque, $T_D$. Only the torsion bar of the steering assistance actuator (140) comprises a torsion-bar torque sensor, and a target torque for the feedback torque actuator (130) is a target steering feel torque compensated for torque sensed in the torsion bar (128).

16 Claims, 1 Drawing Sheet

(56) References Cited

U.S. PATENT DOCUMENTS

2003/0014168 A1    1/2003  Williams
2011/0272204 A1*  11/2011  Nell .......................... B62D 6/10
                                                              180/441
2020/0361522 A1*  11/2020  Weimin ............... B62D 5/0454

FOREIGN PATENT DOCUMENTS

| CN | 107531279   | 1/2018  |
| WO | 2003/006300 | 1/2003  |
| WO | 2006/005730 | 1/2006  |
| WO | 2017/184064 | 10/2017 |

OTHER PUBLICATIONS

Written Opinion issued in parent PCT/SE2019/050754, dated Nov. 29, 2019, pp. 1-8.
Office Action issued in corresponding Chinese Patent Application No. 201980058242.7, dated Aug. 29, 2023, pp. 1-7.

* cited by examiner

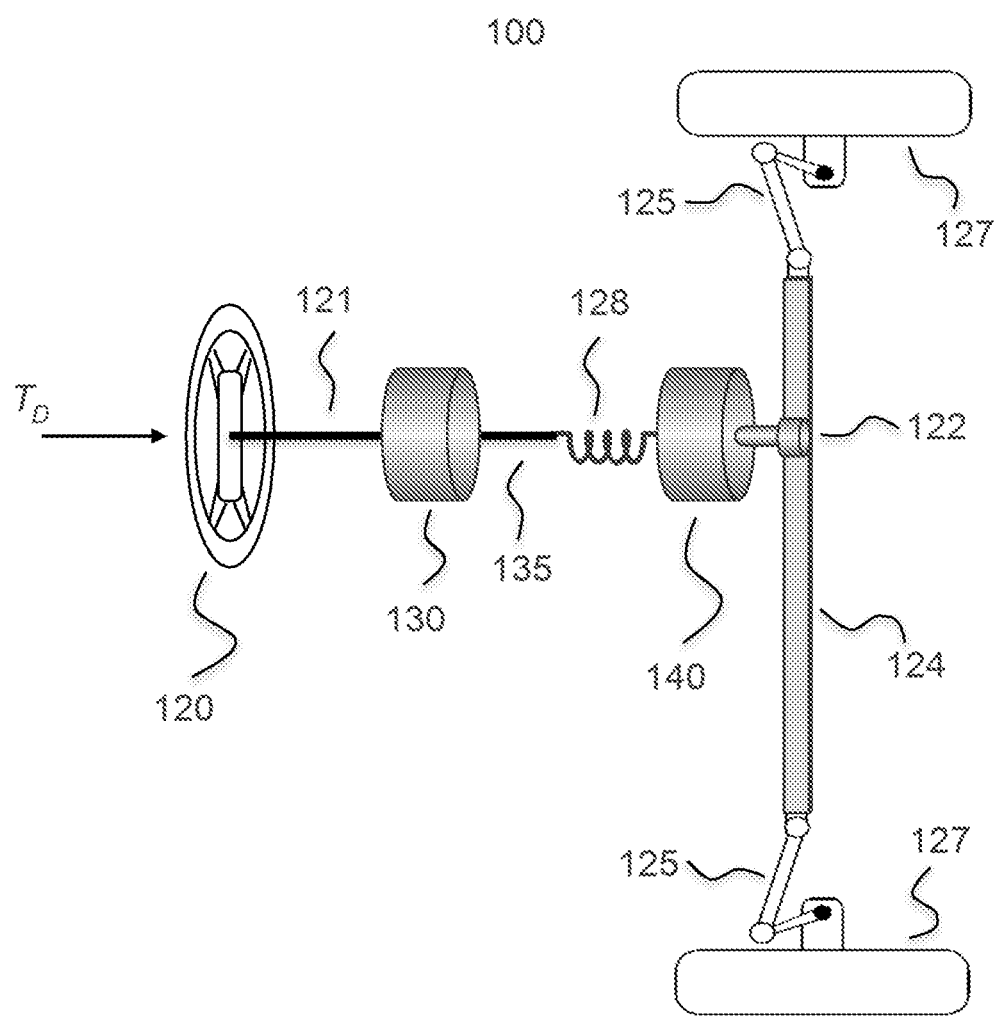

METHOD AND SYSTEM FOR COMBINED HYDRAULIC AND ELECTRIC POWER ASSISTED STEERING

TECHNICAL FIELD

The present invention relates to a steering system, a method and a system for controlling a feedback torque actuator having the features of the pre-characterizing part of claims 1, 6 and 12 respectively.

BACKGROUND

Heavy vehicles and farming vehicles such as e.g. tractors require great steering assistance levels. Therefore, the assistance actuators of today are predominantly hydraulic assistance driven (due to the fact that hydraulics has high power density). That means that if one would like a greater controllability than standard hydraulic assistance valves result in, for functions such as e.g. Lane Keeping Aid (LKA), it is common to add a feedback torque actuator above the hydraulic actuator.

This means that there will be two assistance actuators whereas passenger vehicles of today only need a feedback torque actuator, for solving the whole control problem (both power assistance and controllability for e.g. LKA). Having two assistance actuators in series means that it is normally required to use two torsion bars (for measuring the torque column) in series, which leads to the fact that the column stiffness becomes approximately half its stiffness compared to if only one torsion bar were used. A weak column gives a poor response in control because the driver will have to twist the column before the vehicle begins to turn. In addition, both torsion bars and torque sensors are expensive.

A completely different set of problems with power assistance is the conflict of assistance and disturbances. If there is a high assistance, the driver will have a great noise suppression, but too light steering, which will give a bad steering feel. On the other hand, having a low assistance, the driver will have a good torque build-up and a good steering feel at the expense of noise suppression, i.e. the driver will have a steering that suffers from torque steer, kick-backs (such as forces from e.g. pot-holes that normally will be transferred through the steering system and "kick" the steering wheel away a certain angle) and other disturbances (that typically range from vibrations from an uneven road surface such as e.g. longitudinal ruts to vibrations induced by poor wheel balancing).

Current state-of-the-art steering systems and steering feel for heavy vehicles, construction equipment and tractors suffer from the above-mentioned problems.

WO2017/184064 discloses a method and a system for controlling vehicle steering. In this document solutions are described through which the torque in the column axle is very low, substantially no torque. The feedback torque actuator is controlled to achieve a target steering wheel torque so that the steering wheel torque will be close to the target steering wheel torque. The hydraulic assistance actuator has such a high assistance that the torque above it will be very low. Through knowledge of the wanted steering torque based on the steering angle and the vehicle speed, there is no need neither for a torsion bar, nor for a torsion bar torque sensor, which is very advantageous since torque sensors are expensive. However, since the torque column axle will not be zero, this may be experienced as a deviation in steering feel in the system.

SUMMARY

It is therefore an object of the present invention to provide a steering system, a method, and a system respectively through which one or more of the above mentioned problems can be solved, and particularly through which the steering feel and the steering response will be improved.

It is a particular object of the invention to achieve a good controllability of the steering angle as well as to achieve good steering feel.

Therefore a steering system, a method and a system respectively as initially referred to are provided having the features of the characterizing parts of the respective independent claims 1, 6 and 12.

Advantageous embodiments are given by the appended dependent claims, and by the embodiments described in the detailed description.

Particularly only the torsion bar of the steering assistance actuator comprises a torsion-bar torque sensor, and the feedback torque actuator does not comprise neither a torsion bar nor a torsion bar torque sensor.

In order to have only one torsion bar, the assistance actuator can be equipped with a torsion bar (as usual) for the assistance valve, but with the addition that this torsion bar is equipped with a torsion-bar torque sensor, so that the torque in that torsion bar can be measured.

Furthermore, a feedback torque actuator, in the form of an electrical motor, is advantageously arranged above the hydraulic assistance actuator and the torsion bar of the hydraulic assistance actuator so that an additional torque can be applied over the hydraulic assistance actuator.

The electrical assistance actuator is, as well known for the person skilled in the art, controlled by closed loop current control, where the target current is proportional to the target assistance torque. The actual current is also measured in order for the closed loop control to work. The sensed current is preferably of course also proportional to the actual assistance torque with the same proportionality factor. Hence, an electrical assistance actuator can also be used as a means for torque sensing.

The torque sensed by the driver in the steering wheel, the driver torque, is then the sensed torque in the torsion bar plus the assistance torque from the feedback torque actuator.

That means that such a system will, with the control methods described here, have sensed or estimated signals for:
 driver torque, and
 steering angle,
as well as a feedback torque actuator, just as in traditional electric power assisted steering systems.

However, the control of the feedback torque actuator is far from standard as the driver torque is influenced by both the assistance actuator and the feedback torque actuator. In some embodiments the control algorithm needed in order to give good steering feel is either a modified boost curve control, a modified torque reference generator or an angle reference generator. Other alternatives are also possible.

Further embodiments are described in the detailed description as well as in the dependent claims.

It will be appreciated that features of the invention are susceptible to being combined in any combination without departing from the scope of the invention as defined by the accompanying claims.

Advantageous embodiments are given by the respective appended dependent claims.

BRIEF DESCRIPTION OF THE DRAWINGS

The invention will in the following be further described by way of example only, in a non-limiting manner, and with reference to the accompanying drawings, in which:

FIG. 1. shows a steering system with electric and hydraulic assistance according to the invention.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims and the description as a whole. It should be further understood that the drawings are not necessarily drawn to scale and that, unless otherwise indicated, they are merely intended to conceptually illustrate the structures and procedures described herein. The same reference numerals are used for illustrating corresponding features in the different drawings.

DETAILED DESCRIPTION

FIG. 1 is a schematic FIGURE of a steering system 100. There is a linkage between the front axle road wheels 127 and the steering assistance actuator 140. The linkage consists of a steering rack 124 with associated tie rods 125 connected via a pinion 122 to the steering assistance actuator 140. The steering assistance actuator consists of a hydraulically assisted steering rack (or similar in the case of Pitman arm based steering systems or Orbitrol valves in tractors or construction equipment). The lower part 135 of a steering column incorporates a torsion bar 128 with a torque sensor for measuring the steering torque above the assistance actuator. The feedback torque is actuated by a steering feedback actuator 130, which consists of an assistance motor and an Electric Control Unit, ECU. The driver applies the driver torque, $T_D$, in the steering wheel 120. An upper part 121 of the steering column is located between the steering wheel 120 and the steering feedback actuator 130.

In order to facilitate understanding of the invention, and for explanatory reasons, the following definitions are given:

Definitions

Vehicle States

A state is defined as a translational or rotational position, a velocity or an acceleration, or from one or more of these states derived states, such as e.g. a vehicle slip angle, which is the angle between the vehicle local x-axis and the vehicle speed vector.

A steering angle is here referred to as any angle between the steering wheel and the road wheel times the ratio between the angular degree of freedom and the steering-wheel angular degree of freedom. It can also be a rack position times its ratio between the rack translational degree of freedom to the steering-wheel angular degree of freedom.

A torsion-bar torque is a torque measured by the use of a sensor that is sensitive to a twist of a specific torsion bar that is mounted somewhere in the steering column.

A steering-wheel torque is the torque applied by the driver to the steering wheel. This steering-wheel torque is normally approximated by the torsion-bar torque.

A driver torque is equal to a steering-wheel torque.

Actuators

A steering feedback torque actuator is an actuator, which can be used to influence either the steering-wheel torque or the steering angle.

An assistance actuator is an actuator, which can be used to assist as a servo so that the torque in the axle above said assistance actuator is less than the torque below the actuator. The servo assistance is made by boost-curve control, where a boost curve is a non-linear gain for the level of assistance as a function of the torque in the axle above said assistance actuator.

An actuator is a mechanism or a system that is operated mechanically or by an ECU and converts a source of energy, typically electric current, hydraulic fluid pressure, or pneumatic pressure, into a motion, force or torque.

Electric Architecture

A signal bus is a transmission path on which signals can be read and/or transmitted.

An input signal can for example be the measure of a torque applied by the driver via the steering wheel, measured somewhere between the steering wheel and the wheel, or a signal derived from this quantity.

An ECU is an electric control unit that is used to read analogue sensor signals and digital signals, that can come over e.g. a signal bus, perform any type of computations, such as e.g. perform a control task and actuate actuators, either via a sent analogue or digital signal or by directly controlling e.g. an electric motor from a motor control stage.

Control Theory

Controllability describes the ability of an external input to move the internal state of a system from any initial state to any other final state in a finite time interval.

A transformation is defined as a mathematical function or lookup table with one input value used to produce one output value. That means that a transformation can be used, with its tunable parameters, to create a relation between the input value and the output value with arbitrary tunable shape. A transformation can have time-varying parameters that are even dependent on other values, a so-called gain scheduling, so that the transformation is a function with parameters that themselves are functions. An example of such a transformation is a vehicle state to driver torque relation where the relation is a vehicle speed dependent continuously rising, degressive shaped function.

A transfer function is the relation of the outputs of a system to the inputs of said system, in the Laplace domain, with the variable s, considering its initial conditions. If we, as an example of a single input, single output system, have an input function of $X(s)$, and an output function $Y(s)$, the transfer function $G(s)$ is here defined to be $Y(s)/X(s)$.

A steering-wheel torque measurement is a torque measured in the steering column or steering wheel or a force measured in the steering rack times the torque ratio between the steering rack and the steering wheel.

Frequency blending is a weighted sum in the frequency domain of two signals such that one of the signals is filtered by a certain filter and the other is filtered by a complementary filter. An example of frequency blending is to use a linear first order low-pass filter on one of the two signals and a linear first order high-pass filter on the other and the result of the two filters are summed together.

A complementary filter is a filter such that sum of the complementary filter and the filter that it is complementary to is one over the whole frequency range.

Vehicle Dynamics

A vehicle model is a mathematical model that transforms a road-wheel angle and a vehicle speed to a number of vehicle yaw and/or lateral states, namely vehicle yaw rate and acceleration, vehicle lateral speed and acceleration and vehicle body sideslip angle.

Steering Feel

Steering feel is built of the sum of the following building blocks:
- a lateral acceleration feedback torque,
- a tyre friction torque,
- a steering system friction torque,
- a damping torque, and
- a returnability torque.

A lateral acceleration feedback torque is a torque felt by the driver that corresponds to the lateral acceleration of the vehicle.

A tyre friction torque is the friction between the tyres and the road or a model of this friction.

A steering system friction or a friction torque is the friction of the parts of the linkage of the steering system or a model of this friction.

A damping torque occurs owing to damping of the tyres and the steering system or a model of this damping.

A returnability torque comes from the geometry of the steering system or a model of the steering system.

These torque contributions can be vehicle speed dependent. The torque contributions can also be calculated via mathematical models or sensed via sensors in the vehicle or steering system.

The lateral acceleration torque is calculated from a bicycle model, which uses vehicle speed and steering angle as input, and give the lateral acceleration as output. The lateral acceleration feedback is a function of the lateral acceleration calculated from the vehicle model.

The mathematical model of the tyre friction torque is a model of an angle or angular speed driven hysteresis. The mathematical model of the tyre also contains a relaxation part such that as the tyre rolls, the torque of the hysteresis will have a relaxation length so that the hysteresis torque decreases with the rolling length of the tyre. The relaxation can preferably be the well-known half-life exponential decay function.

The model of the tyre friction is the combination of the hysteresis and the relaxation so that e.g. an increase owing to the hysteresis torque can happen at the same time as the torque decrease owing to the relaxation. The resulting torque of the model is the sum of the two parts.

The mathematical model of the friction torque is a model of an angle or angular speed driven hysteresis. The maximum torque in the hysteresis can be shaped by a function so that the maximum torque is different on centre compared to off centre.

The mathematical model of the damping torque consists of a damping constant times an angular speed or translational speed, such as e.g. the rack velocity, measured somewhere in the linkage, where the linkage is either mechanical or hydraulic, between the road wheels and the steering wheel. The damping constant can be such that the damping has a blow-off, such that the damping constant decreases for great angular or translational speeds. The damping constant can be vehicle speed dependent as well as different for steering outwards compared to inwards. The damping constant can also be a function of the steering-wheel or torsion-bar torque.

The returnability torque is a vehicle speed dependent and steering-wheel angle or steering angle dependent torque.

A torque reference generator is a steering feel control concept where the target steering-wheel torque is calculated in a reference generator, and this reference steering-wheel torque is then used to control the feedback torque actuator to this reference torque.

A target steering-wheel torque is the sum of the lateral acceleration feedback torque, the above-mentioned tyre friction torque, the friction torque, the damping torque and the returnability torque.

An angle reference generator is a steering feel control concept where the target assistance actuator angle is calculated in a reference generator, and this reference feedback torque actuator angle is then used to control the feedback torque actuator to this reference angle.

A target steering angle, in the angle reference generator, is based on the equation of the target steering-wheel torque, where the target steering-wheel torque is the sum of the lateral acceleration feedback torque, the above-mentioned tyre friction torque, the friction torque, the damping torque and the returnability torque. If the target steering-wheel torque, in this equation is changed to the sensed or estimated driver torque, the steering angle can be derived out of this steering angle dependent equation. This derived steering angle is the target steering angle of the angle reference generator.

Note, specifically, that the target steering angle can come from e.g. a lane keeping aid system, an auto pilot system or a system for autonomous driving.

Advantageous Embodiments

According to one aspect of the present invention, it is an objective to achieve a good controllability of the steering angle as well as to achieve a good steering feel by introducing a system with only one torsion bar. In an advantageous embodiment, in order to achieve these benefits, the system is as follows:

The system shall contain a steering assistance actuator 140 with a torsion bar 128.

This torsion bar shall be equipped with a torsion-bar torque sensor.

The system shall furthermore contain a feedback torque actuator 130.

The feedback torque actuator 130 shall have an angle sensor so that the steering angle can be achieved.

The motor shall be equipped with an ECU for the control of the feedback torque.

The ECU preferably comprises means for measuring the current of the torque control of the motor of the feedback torque actuator 130.

The ECU further preferably comprises
- means for calculating the feedback torque by the use of the before-mentioned current measurements,
- means for calculating the target feedback torque as well as
- means to control and actuate the target feedback torque to reach the target feedback torque without the feedback torque actuator 130 having a torsion bar or torsion-bar torque sensor.

With this system, and means for feedback torque actuation, both a good controllability of the steering angle as well as good steering feel can be achieved.

The torsion-bar torque sensor can preferably be of the kind that has both torque and angle sensing, a so-called Torque and Angle Sensor (TAS). If using a TAS, the motor of the feedback actuator does not need to contain an angle sensor.

The method comprises calculation of a target feedback torque actuator state. A target feedback torque actuator state is here particularly defined as a target feedback torque or a target steering angle.

In one particular embodiment a target driver torque is calculated, e.g. using a torque reference generator, and a target feedback torque actuator state comprising a target feedback torque is calculated by subtracting the torsion-bar torque from the target driver state.

In one particular embodiment, a method of controlling the system described above comprises the following steps for feedback torque control:

Measurement of a steering angle with the aid of either the angle sensor in the TAS or the angle sensor in the feedback torque actuator.

Measurement of a torsion-bar torque with the aid of the before-mentioned torsion-bar torque sensor.

Measurement of a current in the motor of the feedback torque actuator 130.

Transformation of the above-mentioned current to an estimated feedback torque by the use of the current to torque characteristics of the motor, which in essence is a proportionality factor or a known torque and angle dependent transformation.

Calculation of a driver torque by adding the torsion-bar torque and the estimated feedback torque together.

Calculation of a target driver torque by the use of a torque reference generator as described in detail in the definition part of this description.

Calculation of a target feedback torque by subtracting the torsion-bar torque from the target driver torque.

Control of the mentioned feedback torque actuator via a closed loop current control to achieve said target feedback torque.

With these method steps, both a good controllability of the steering angle as well as good steering feel can be achieved.

In another embodiment, the method of controlling the system described above comprises the following steps for feedback torque control:

Measurement of a steering angle with the aid of either the angle sensor in the TAS or the angle sensor in the feedback torque actuator.

Measurement of a torsion-bar torque with the aid of the before-mentioned torsion-bar torque sensor.

Measurement of a current in the motor of the feedback torque actuator 130.

Transformation of the above-mentioned current to an estimated feedback torque by the use of the current to torque characteristics of the motor, which in essence is a proportionality factor or a known torque and angle dependent transformation.

Calculation of a driver torque by adding the torsion-bar torque and the estimated feedback torque together.

Calculation of a target steering angle by the use of an angle reference generator as described in detail in the definition part of this description.

Control of the mentioned feedback torque actuator via a closed loop current control to achieve said target steering angle.

With these method steps, both a good controllability of the steering angle as well as good steering feel can be achieved.

In still another embodiment, the method of controlling the system described above comprises the following steps for feedback torque control:

Measurement of a steering angle with the aid of either the angle sensor in the TAS or the angle sensor in the feedback torque actuator.

Measurement of a torsion-bar torque with the aid of the before-mentioned torsion-bar torque sensor.

Measurement of a current in the motor of the feedback torque actuator 130.

Transformation of the above-mentioned current to an estimated feedback torque by the use of the current to torque characteristics of the motor, which in essence is a proportionality factor or a known torque and angle dependent transformation.

Calculation of a driver torque by adding the torsion-bar torque and the estimated feedback torque together.

Calculation of a target feedback torque by the use of a boost curve.

Control of the mentioned feedback torque actuator via a closed loop current control to achieve said target feedback torque.

With these method steps, both good controllability of the steering angle as well as good steering feel can be achieved.

It should be clear that the invention is not limited to the specifically illustrated embodiments but that it can be varied in a number of ways within the scope of the appended claims.

The invention claimed is:

1. A steering system comprising:
a steering assistance actuator with a torsion bar and a feedback torque actuator with a motor with an Electric Control Unit (ECU) for giving feedback to a driver, and
a steering wheel to which the driver applies a driver torque ($T_D$),
wherein the steering assistance actuator comprises a torsion-bar torque sensor for sensing the torque in the torsion bar,
means for measuring a steering angle, and
the ECU of the motor of the feedback torque actuator comprises means for calculating the driver torque ($T_D$) and means for calculating a target feedback torque actuator state, comprising a target feedback torque or a target steering angle, for controlling the feedback torque actuator such that the target feedback torque actuator state is reached,
the target feedback torque actuator state for the feedback torque actuator being a target steering feel torque compensated with the torque sensed in the torsion-bar torque sensor, and
the ECU is configured for measuring a current in the motor of the feedback torque actuator to provide current measurements, transforming the current to an estimated feedback torque by the use of a current-to-torque characteristics of the motor, calculating the driver torque by adding the sensed torsion-bar torque and the estimated feedback torque, calculating the target feedback torque actuator state from either said calculated driver torque or from said measured steering angle, and controlling the feedback torque actuator via a closed loop current control to achieve the target feedback torque actuator state.

2. The steering system according to claim 1, wherein the feedback torque actuator comprises an angle sensor forming said means for measuring the steering angle.

3. The steering system according to claim 1, wherein the torsion-bar torque sensor comprises a Torque and Angle Sensor (TAS) and the torsion-bar torque sensor comprises said means for measuring the steering angle.

4. The steering system according to claim 1, wherein the ECU is configured for calculating the feedback torque actuator state by the use of the current measurements, and to control and actuate the target feedback torque actuator to reach the target feedback torque without the feedback torque actuator having a torsion bar or torsion-bar torque sensor.

5. A method for controlling a feedback torque actuator with a motor with an Electric Control Unit (ECU) for giving feedback to a driver, a steering wheel to which the driver applies a driver torque (TD) in a steering system comprising a steering assistance actuator with a torsion bar, wherein the method incorporates the following steps for feedback torque control:

measuring a steering angle using a steering angle sensing means, measuring a torsion-bar torque with the use of a torsion-bar torque sensor of the assistance actuator, measuring a current in the motor of said feedback torque actuator, transforming the current to an estimated feedback torque by the use of a current-to-torque characteristics of the motor, calculating the driver torque by adding the sensed torsion-bar torque and the estimated feedback torque, calculating a target feedback torque actuator state from either said calculated driver torque or from said measured steering angle, and controlling the mentioned feedback torque actuator via a closed loop current control to achieve said target feedback torque actuator state, so that a desired steering feel is achieved.

6. The method according to claim 5, wherein the target feedback torque actuator state comprises a target steering angle, and in that in the controlling step via the closed loop current the feedback torque actuator is controlled to achieve said target steering angle, so that the steering angle will be close to the above-mentioned target steering angle whereby a desired steering feel is achieved.

7. The method according to claim 6, wherein the target steering angle is calculated by the use of an angle reference generator.

8. The method according to claim 5, wherein the target feedback torque actuator state comprises a target feedback torque, and in that in the controlling step via the closed loop current the feedback torque actuator is controlled to achieve said target feedback torque, so that the steering angle will be close to the above-mentioned target steering angle whereby desired steering feel is achieved.

9. The method according to claim 8, the target feedback torque is calculated by the use of a boost curve.

10. The method according to claim 5, the method comprises the steps of calculating a target driver torque by using a torque reference generator; and calculating a target feedback torque by subtracting the torsion bar torque from the target driver torque.

11. A system for controlling a feedback torque actuator with a motor with an Electric Control Unit (ECU) for giving feedback to a driver, a steering wheel to which the driver applies a driver torque (TD) in a steering system comprising a steering assistance actuator with a torsion bar, wherein the system comprises:

means for measurement of a steering angle, a torsion bar torque sensor for measurement of the torque of the torsion bar, the ECU comprising:

means for measurement of a current in the motor of said feedback torque actuator, means for transformation of the above-mentioned current to an estimated feedback torque by the use of a current-to-torque characteristics of the motor, means for calculation of the before-mentioned driver torque by adding the sensed torsion-bar torque and the estimated feedback torque, means for calculation of a target feedback torque actuator state from either said calculated driver torque or said measured steering angle, and means for control of the mentioned feedback torque actuator via a closed loop current control to achieve said target feedback torque actuator state, so that a desired steering feel is achieved.

12. The system according to claim 11, wherein the target feedback torque actuator state comprises a target feedback torque, and in that in the controlling step via the closed loop current the feedback torque actuator is controlled to achieve said target feedback torque, so that the steering angle will be close to the above-mentioned target steering angle whereby desired steering feel is achieved.

13. The system according to claim 12, wherein the target feedback torque actuator state comprises a target steering angle, and in that the target steering angle is calculated by the use of an angle reference generator.

14. The system according to claim 11, wherein the target feedback torque actuator state comprises a target feedback torque, and in that the feedback torque actuator is controlled via the closed loop control to achieve said target feedback torque, so that the steering angle will be close to the above-mentioned target steering angle whereby desired steering feel is achieved.

15. The system according to claim 14, wherein the target feedback torque is calculated by the use of a boost curve.

16. The system according to claim 11, wherein the target feedback torque actuator state comprises a target feedback torque, and in that:

a target driver torque is calculated by use of a torque reference generator, and a target feedback torque is calculated by subtraction of the torsion bar torque from the target driver torque.

* * * * *